United States Patent
Albert et al.

(10) Patent No.: US 10,562,003 B2
(45) Date of Patent: Feb. 18, 2020

(54) CHEMICAL SYNTHESIS AND SYNTHESIS REACTORS

(71) Applicant: Siemens Aktiengesellschaft, Munich (DE)

(72) Inventors: Jakob Albert, Rathsberg (DE); Manfred Baldauf, Erlangen (DE); Jenny Reichert, Erlangen (DE); Alexander Tremel, Moehrendorf (DE); Peter Wasserscheid, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/550,114

(22) PCT Filed: Jan. 20, 2016

(86) PCT No.: PCT/EP2016/051046
§ 371 (c)(1),
(2) Date: Aug. 10, 2017

(87) PCT Pub. No.: WO2016/128187
PCT Pub. Date: Aug. 18, 2016

(65) Prior Publication Data
US 2018/0028996 A1    Feb. 1, 2018

Related U.S. Application Data

(63) Continuation of application No. PCT/EP2016/051046, filed on Jan. 20, 2016.

(30) Foreign Application Priority Data

Feb. 13, 2015   (DE) .................... 10 2015 202 680

(51) Int. Cl.
  *B01J 8/04*     (2006.01)
  *B01J 8/18*     (2006.01)
  (Continued)

(52) U.S. Cl.
  CPC ........... *B01J 8/0453* (2013.01); *B01J 8/0496* (2013.01); *B01J 8/1836* (2013.01); *B01J 8/26* (2013.01);
  (Continued)

(58) Field of Classification Search
  CPC .......... C10G 2/32; C10G 2/00; B01J 37/0238; B01J 19/2435; B01J 2219/0004; B01J 2219/00121
  See application file for complete search history.

(56) References Cited

U.S. PATENT DOCUMENTS

| 5,925,685 A | 7/1999 | Adams et al. ................ 518/700 |
| 7,087,097 B1 | 8/2006 | Karl .................................. 48/76 |

(Continued)

FOREIGN PATENT DOCUMENTS

| CN | 101687658 A | 3/2010 | ............... B01J 8/04 |
| DE | 69816855 T2 | 4/2004 | ............... B01D 3/00 |

(Continued)

OTHER PUBLICATIONS

Karl, J. et al., "Allothenne Wirbelschichtvergasung—Möglichkeiten zur Realisierung des Wärmeeintrages in Wirbelschichten," Lehrstuhl für Thermische Kraftanlage Technische Universität München; URL: https://www.energetische-biomassennutzung.de/fileadmin/user_upload/Optimierung_Achental/Dokumente/200X.Kar.Allotherme_Wirbelschichtvergasung.pdf, 9 pages (German language w/ English statement of relevance), dated 2000.

(Continued)

*Primary Examiner* — Jafar F Parsa
(74) *Attorney, Agent, or Firm* — Slayden Grubert Beard PLLC

(57) ABSTRACT

The present disclosure relates to chemical synthesis. The teachings thereof may be embodied in methods for chemical synthesis and/or reactors for synthesis. The teaching may increase the conversion of equilibrium-limited reactions in a single pass through a synthesis reactor. For example, a method may include: introducing a synthesis reactant into a reaction chamber with a prevailing pressure p1; forming a synthesis product; discharging the product and any unreacted reactant; separating the product from the unreacted reactant; and introducing the unreacted reactant into a second reaction chamber with a prevailing pressure p2 lower than the pressure p1.

8 Claims, 1 Drawing Sheet

(51) Int. Cl.
| | | |
|---|---|---|
| B01J 8/22 | (2006.01) | |
| B01J 8/26 | (2006.01) | |
| B01J 8/28 | (2006.01) | |
| B01J 12/00 | (2006.01) | |
| B01J 19/24 | (2006.01) | |
| C10G 2/00 | (2006.01) | |

(52) U.S. Cl.
CPC ............... *C10G 2/00* (2013.01); *C10G 2/32* (2013.01); *B01J 2208/00132* (2013.01); *B01J 2208/00176* (2013.01)

(56) References Cited

U.S. PATENT DOCUMENTS

| | | | | |
|---|---|---|---|---|
| 2002/0083829 | A1 | 7/2002 | Edlund et al. | 95/55 |
| 2007/0021514 | A1 | 1/2007 | Lattner | 518/726 |
| 2009/0131685 | A1 | 5/2009 | Emmel et al. | 549/213 |
| 2010/0324157 | A1* | 12/2010 | Bauman | B01J 19/0046 518/706 |
| 2011/0300027 | A1 | 12/2011 | Hofmeister et al. | 422/145 |
| 2012/0141345 | A1 | 6/2012 | Slaten | 423/235 |
| 2012/0196943 | A1* | 8/2012 | Alyaser | C01B 3/32 518/702 |
| 2012/0269697 | A1 | 10/2012 | Thorhauge | 422/198 |
| 2013/0203872 | A1 | 8/2013 | Laurenzi | 518/705 |
| 2016/0030926 | A1* | 2/2016 | Noyes | C23C 16/06 502/185 |

FOREIGN PATENT DOCUMENTS

| | | | | |
|---|---|---|---|---|
| DE | 102006050717 A1 | 4/2007 | ........... | C07D 521/00 |
| EP | 1707259 A1 | 10/2006 | ............... | B01J 8/04 |
| GB | 2249547 A | 5/1992 | ............... | B01J 8/18 |
| WO | 82/00656 A1 | 3/1982 | ............... | C10G 1/08 |
| WO | 97/41953 A1 | 11/1997 | ............. | B01J 10/00 |
| WO | 00/77128 A1 | 12/2000 | ............... | B01J 8/00 |
| WO | 2009/106231 A1 | 9/2009 | ............... | B01J 8/02 |
| WO | 2012/052204 A1 | 4/2012 | ............... | B01J 8/04 |
| WO | 2014/116203 A1 | 7/2014 | ............... | B01J 8/18 |
| WO | 2016/128187 A1 | 8/2016 | ............. | B01J 19/24 |

OTHER PUBLICATIONS

International Search Report and Written Opinion, Application No. PCT/EP2016/051046, 14 pages, dated May 24, 2016.

Chilean Office Action, Application No. 201702036, 9 pages, dated Jan. 17, 2019.

European Office Action, Application No. 16702887.7, 5 pages, dated May 17, 2019.

Chinese Office Action, Application No. 201680010032.7, 7 pages, dated Nov. 12, 2019.

\* cited by examiner

CHEMICAL SYNTHESIS AND SYNTHESIS REACTORS

CROSS-REFERENCE TO RELATED APPLICATIONS

This application is a U.S. National Stage application of International Application No. PCT/EP2016/051046 filed Jan. 20, 2016, which designates the United States of America, and claims priority to DE Application No. 10 2015 202 680.9 filed Feb. 13, 2015, the contents of which are hereby incorporated by reference in their entirety.

TECHNICAL FIELD

The present disclosure relates to chemical synthesis. The teachings thereof may be embodied in methods for chemical synthesis and/or reactors for synthesis. The teaching may increase the conversion of equilibrium-limited reactions in a single pass through a synthesis reactor.

BACKGROUND

Conversion in chemical reactions is limited by the equilibrium position of the reaction. If the chemical equilibrium in a synthesis reaction is only partly to the side of the products, a one-stage reaction regime leads to partial conversion. Therefore, only a portion of the reactants is converted in one pass through the reactor.

Very many reactions are equilibrium-limited. In chemical synthesis, these are, for example, the production of methanol from hydrogen and carbon monoxide and/or carbon dioxide, or the production of ammonia from hydrogen and nitrogen. Nowadays, these reactions take place in heterogeneous catalyzed fixed bed reactors or slurry reactors. The reactants are only partly converted in a single pass through the reactor. Thereafter, the reaction products are typically removed and the unconverted reactants are recirculated to the reaction inlet.

The recirculation of volumes of gas that are large in some cases leads to high apparatus complexity. The pressure drop in the reactor is compensated for by a recirculation unit. This is usually operated at high temperatures and leads to high costs. Moreover, the recirculation results in accumulation of inert and extraneous gases in the circuit, which leads to adverse effects on the reaction regime. In the case of recirculation, therefore, a small amount of recirculation gas is drawn off continuously, which results in losses of reactants and hence lower reaction conversions. Moreover, the recycled gas volume leads to a high gas volume flow rate through the reactor, which increases the construction size and hence the costs of the reactor.

SUMMARY

The teachings of the present disclosure may allow methods for chemical synthesis, in which a higher conversion level of the reactants is achievable compared to the prior art with equal or reduced energy expenditure. For example, a method of conducting a chemical synthesis, may comprise: introducing at least one synthesis reactant (2) into a reaction chamber (4) in which there is a prevailing pressure p1, forming at least one synthesis product (6) in the reaction chamber (4), discharging the synthesis product (6) and any unreacted synthesis reactant (8) from the reaction chamber (4), separating the synthesis product (6) from the unreacted synthesis reactant (8) and introducing the unreacted synthesis reactant (8) into a second reaction chamber (10) in which there is a prevailing pressure p2 lower than the pressure p1.

In some embodiments, the two reaction chambers (4, 10) are connected by a heat pipe (12) and in that the heat of reaction is exchanged between the reaction chambers (4, 10).

In some embodiments, the heat pipe (12) is conducted out of at least one of the two or more (?) reaction chambers (4, 10), with removal of heat energy therefrom at one end of the heat pipe (12) where it is conducted out.

In some embodiments, the reaction chambers (4, 10) are charged with carrier liquid (16) into which the synthesis reactant (2) is introduced, with conversion of the synthesis reactant (2) to the synthesis product (6) in the carrier liquid (16).

In some embodiments, a particulate catalyst is supplied to the carrier liquid (16).

In some embodiments, the carrier liquid (16) is an oil, especially a heat carrier oil.

In some embodiments, the reaction chambers are configured as a fixed bed reactor with a catalyst and the reaction of synthesis reactant to give synthesis product is conducted in the gas phase.

In some embodiments, the reaction chambers are configured as a fluidized bed reactor with a catalyst, wherein a gas stream flowing in from the bottom fluidizes a bed at least partly composed of catalyst material and the reaction of synthesis reactant to give synthesis product is conducted in the gas phase.

Some embodiments include a synthesis reactor comprising at least two reaction chambers (4, 10), wherein at least one first reaction chamber (4) has a feed apparatus (3) for a synthesis reactant (2) and the first reaction chamber (4) is connected to a second reaction chamber (10) via an inlet (7), wherein a product separation apparatus (18) is arranged in the inlet (7) and wherein, in a state of operation of the synthesis reactor (20), there is a higher pressure in the first reaction chamber (4) than in the second reaction chamber (10).

In some embodiments, at least one heat pipe (12) that connects the at least two reaction chambers (4, 10) is provided, by means of which heat of reaction is exchanged between the reaction chambers (4, 10).

In some embodiments, the heat pipe (12) projects out of at least one of the at least two reaction chambers (4, 10), with removal of heat energy at a projecting end (14) of the heat pipe (12).

BRIEF DESCRIPTION OF THE DRAWINGS

Further configurations and further features are elucidated in detail with reference to the figures which follow. The figures which follow are merely schematic working examples that do not constitute any restriction on the scope of protection.

The figures show.

DETAILED DESCRIPTION

Figure 1:
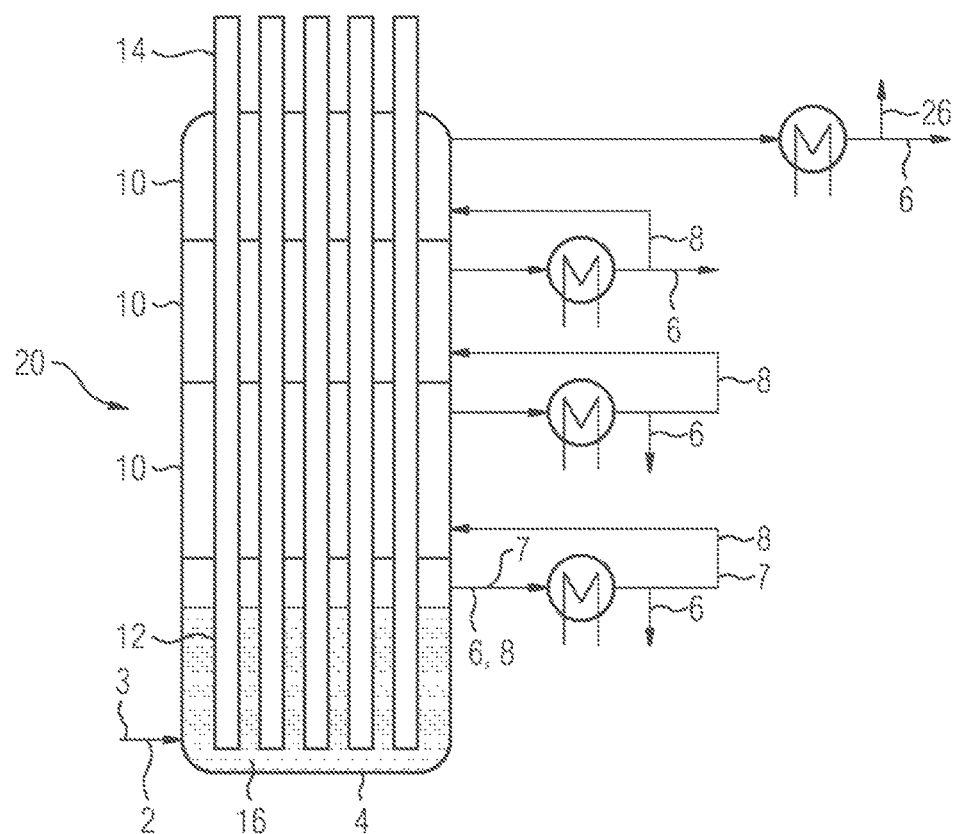
FIG. 1 a schematic diagram of a multistage reactor for performance of a chemical synthesis according to teachings of the present disclosure.

Example methods for conducting a chemical synthesis may include the following steps:

Firstly, a synthesis reactant is introduced into a reaction chamber. There is a pressure P1 within this reaction chamber. Thereafter, at least one synthesis product is formed from the synthesis reactant in the reaction chamber. Thereafter, this synthesis product and synthesis reactant that has not reacted during the reaction, i.e. unreacted synthesis reactant, is discharged from the reaction chamber. Thereafter, outside the reaction chamber, the synthesis product is separated from the unreacted synthesis reactant, and the isolated unreacted synthesis reactant is then introduced into a second reaction chamber, the pressure in the second reaction chamber being a pressure P2 which is lower than the pressure P1 in the first reaction chamber.

The teachings of the present disclosure may make it possible, on attainment of a chemical equilibrium between synthesis reactants and synthesis products, to separate the synthesis products and, in a further reaction chamber, to bring the synthesis reactants that are now not at chemical equilibrium again, by means of suitable reaction conditions such as pressure and temperature, in turn to the chemical equilibrium described and to separate synthesis products once more. In this way, it is possible to gradually conduct a chemical reaction that does not run to completion in such a way that, after a multitude of reaction stages or applications of reaction chambers, there is virtually complete conversion of the synthesis reactants introduced at the outset.

The effect of lowering the reactor pressure from the first reaction chamber to the second reaction chamber is that the unreacted synthesis reactants and the synthesis products flow from one reaction chamber across into the second reaction chamber without additional pressure-increasing devices such as fans or compressors. This is energy-saving and promotes the economic viability of the overall conversion process.

In some embodiments, at least one heat pipe connects the two reaction chambers to one another. The heat pipe exchanges heat of reaction that occurs in exothermic reactions between the reaction chambers. Heat can be exchanged via the heat pipe in the case of endothermic reactions as well. In some embodiments, the heat pipe leaves one of the reaction chambers in such a way that one end of the heat pipe is outside at least one of the reaction chambers, and there is removal of heat energy at this end that has been conducted out of the reaction chambers, for example by means of an appropriate cooling apparatus (in the case of an exothermic reaction regime) or, if appropriate, a heating apparatus (in the case of an endothermic reaction regime).

Cooling is also possible relying solely on the outside temperature, which is lower than the temperature in the reaction chambers. In this way, an isothermal reaction regime is ensured between the at least two and generally more than two reaction chambers, meaning that there is always a virtually identical reaction temperature in the individual reaction chambers because of the use of the heat pipes that enable high heat flows between the chambers and to the outside.

In some embodiments, the reaction chambers are charged with carrier liquid into which the synthesis reactant is introduced. The reaction of the synthesis reactant to give the synthesis product then proceeds in the carrier liquid, with at least partial dissolution of the synthesis reactant that may be in gaseous form in the carrier liquid. To promote the performance of the reaction, the carrier liquid is supplied with a particulate catalyst which is finely dispersed therein. The catalyst promotes the reaction of synthesis reactants to give synthesis products through surface reactions and in so doing especially affects the reaction rate. An example carrier liquid may comprise a nonpolar liquid, for example oil, especially a heat carrier oil. As an alternative to a reaction regime in a liquid phase, it is also possible to conduct the reaction in a fixed bed reactor using a catalyst. The reaction of synthesis reactant to give the synthesis product proceeds in the gas phase here. This reaction regime has the advantage over the reaction regime in a carrier liquid that the reactor construction is simplified. In the case of reaction in the gas phase, however, the regulation of temperature, particularly via the use of heat pipes, is more technologically complex and more difficult to control.

In some embodiments, the reaction can take place in a fluidized bed reactor, likewise in the use of a catalyst, wherein a gas stream flowing in from the bottom fluidizes a bed at least partly comprising catalyst material. The reaction of synthesis reactant to give synthesis product likewise takes place in the gas phase, with occurrence of the same advantages and disadvantages with respect to the use of a carrier liquid.

In some embodiments, a synthesis reactor may have at least two reaction chambers, with at least one first reaction chamber having at least one feed apparatus for a synthesis reactant or, according to the reaction, multiple synthesis reactants. The first reaction chamber here is connected to a second reaction chamber via an inlet, with arrangement in the inlet of a product separation apparatus where at least one synthesis product that has formed from the synthesis reactant in the first reaction chamber is separated out of a mixture of unreacted synthesis reactant and synthesis product. In a state of operation of the synthesis reactor, there is a higher pressure in the first reaction chamber than in the second reaction chamber. Here too, the same advantages over the prior art that have already been described are established, these especially being the virtually complete conversion of chemical reactions that are equilibrium-limited.

In some embodiments, the synthesis reactor is equipped with at least one heat pipe that connects the two reaction chambers to one another and exchanges heat of reaction between the reaction chambers. If the heat pipe leaves one of the reaction chambers, it is possible for heat energy to be supplied or removed at this end that projects out of the reaction chambers, which again achieves the state already described that the reaction chambers are connected to one another in a virtually isothermal manner, meaning that there is virtually the same reaction temperature in the reaction chambers in spite of exothermic or endothermic reaction taking place therein. This again is advantageous for the individual reactions in the reaction chambers proceeding virtually uniformly and hence enabling advantageous reaction control in the individual reaction chambers.

By way of example, FIG. 1 is intended for detailed elucidation of a method of performing a chemical synthesis and of a synthesis reactor 20 employed for the purpose. The synthesis reactor 20, e.g., when constructed in the form of a stack as shown in FIG. 1, has a feed apparatus 3 for synthesis reactants 2 in its lower region. The synthesis reactants 2 are thus conducted into a first reaction chamber 4 in which there is already a carrier liquid 16 in the form of an oil which is a nonpolar liquid. By way of example, hydrogen and carbon dioxide and/or carbon monoxide are introduced here as reactant, in which case a reaction to give methanol takes place.

Also introduced in the carrier liquid 16 is a particulate catalyst in fine dispersion which is not shown in detail here. The synthesis reactants 2 can especially react here at the catalyst surface to give methanol. The gaseous reactants 2, after they have been introduced into the reactor chamber 4, can partly dissolve in the carrier liquid 16. The reaction then takes place over catalyst particles, especially at the surface thereof. As a result of diffusion back into the gas phase, the products accumulate there and can be drawn off above the liquid phase. There is a pressure of about 90 bar in the reaction chamber. The temperature is preferably within a spectrum between 150° C. and 350° C., in this example at 250° C. The synthesis products 6 and unreacted synthesis reactants 8 are drawn off via an inlet 7 that connects the first reaction chamber 4 to a second reaction chamber 10.

The remaining synthesis reactants 2 flow into the next reaction stage, e.g. into the next reaction chamber 10. This reaction stage in the reaction chamber 10 is conducted at a lower reaction pressure than the reaction stage in the reaction chamber 4 to enable the remaining synthesis reactants to flow across without the incorporation of a pressure-increasing device, for example a fan or a compressor. The pressure difference between the reaction stages may be chosen to compensate for pressure drops when the materials flow across from stage 1 in reaction chamber 4 to stage in the reaction chamber 10. In some embodiments, there is a pressure difference of about 5 bar from one reaction chamber to the other.

A valve 20 may be included for adjustment and regulation of the volume of gas of synthesis reactants 2 that flows across. In stage 2 in the reaction chamber 10, the synthesis reactants 2 can then again react up to chemical equilibrium. The construction of the reactor 20 repeats stage for stage, and a sufficient number of stages in the form of reaction chambers 10 are used as needed and economically viable for the very substantially complete conversion of the synthesis reactants 2. Since the amount of synthesis reactants 2 decreases through the stages as a result of the respective removal of synthesis products 6, the dimensions of the reaction chambers 10 can optionally be reduced from stage to stage. The reactant gas remaining at the last reaction stage contains extraneous and inert gases, and it can be drawn off as purge gas 26. Alternatively, it is also possible to recycle this gas to the reaction inlet in the feed apparatus 3, optionally after processing.

In some embodiments, the various reaction chambers 4 and 10 are connected to one another by heat pipes 12. A heat pipe 12 in the simplest case is a closed pipe in which there is a heat transfer medium in the two-phase region. If heat is supplied at any desired point in the heat pipe, there is evaporation of the heat transfer medium. The vapor then flows to the colder end and condenses again there. By means of this process, it is possible to transfer very high heat flows virtually isothermally in a compact design. The liquid phase can flow back solely due to gravity if the evaporation takes place at the lower end of the pipe 12 and the condensation at the top. The recycling of liquid phase can also be ensured by capillary effects, for example through the incorporation of wire meshes or wicks.

The heat pipes in the reactor 20 presented may include internals (not shown here) which enable homogeneous wetting of the inner wall with liquid phase. As a result, evaporation and condensation can take place anywhere along the heat pipe 12. Evaporation always takes place in the hottest region of the heat pipe 12, and in that case the condensation in the coldest region. The concept therefore enables very effective and flexible heat exchange between the individual reaction chambers 4, 10. This enables a virtually isothermal reaction regime along the entire synthesis reactor 20.

The various stages in the form of the reaction chambers 4 and 10 are operated at different pressures ($p_1, p_2 \ldots p_n$), but at virtually constant temperature. The heat pipes 12 can be conducted out of the synthesis reactor 20 at the upper or lower end. This enables supply of heat or removal of heat at this end 14 of the heat pipe 12 that has been conducted out of the synthesis reactor 20. In the case of exothermic reactions, in general, removal of heat in the form of cooling is necessary. Cooling at the end of the heat pipe thus enables a constant temperature along the reactor. For typical reaction temperatures of chemical syntheses, which are between 150° C. and 350° C., the heat pipes 12 are preferably operated with water as heat carrier medium. Within this temperature range, water enables good heat transfer capacities and acceptable vapor pressures, and hence an acceptable wall thickness of the heat pipe(s) 12. Alternatively, it is also possible to use other heat carrier media or multisubstance mixtures.

The individual reaction chambers can be constructed in various designs. For example, a catalyst may be incorporated in a fixed bed or the heat pipes may be provided with a catalyst structure on the surface and the reaction in that case takes place in the gas phase over a catalyst. In addition, the reaction chambers may be executed as fluidized beds. This involves fluidization of a bed at least partly composed of catalyst material by inflow of a gas from the bottom. The reaction then takes place at the catalyst surface in the gas phase.

In some embodiments, the individual reaction chambers 4, 10 comprise liquid phase reactors, called slurry reactors. Catalyst particles are used here in fine distribution in a carrier liquid 16. The gaseous synthesis reactants 2, for example the reactants $H_2$ and $CO_2/CO$ for preparation of methanol, are introduced into the reaction chamber 4, and there is at least partial dissolution of the synthesis reactants 2 in the carrier liquid 16. The reaction then takes place at the surfaces of the catalyst particles. As a result of diffusion back into the gas phase, the synthesis products 6 in the gas phase then accumulate in the reaction chamber 4 and can be conducted away into the inlet 7 to the reaction chamber 10 above the carrier liquid level 19.

To obtain the mixing of carrier liquid 16, catalyst particles and the gaseous synthesis reactants 2 in very substantially homogeneous and finely distributed form, it is appropriate to incorporate a suitable mixing apparatus in the form of a stirrer (not shown in the figure). Alternatively, it is also possible to introduce the gaseous synthesis reactants 2 in such a way that some degree of pressurization assures mixing owing to swirling on introduction of the gas phase. As well as the mixing, these measures also lead to an increase in heat transfer between the carrier liquid 16, which is preferably in the form of a heat carrier oil, and the heat pipe(s) 12.

Figure 2:
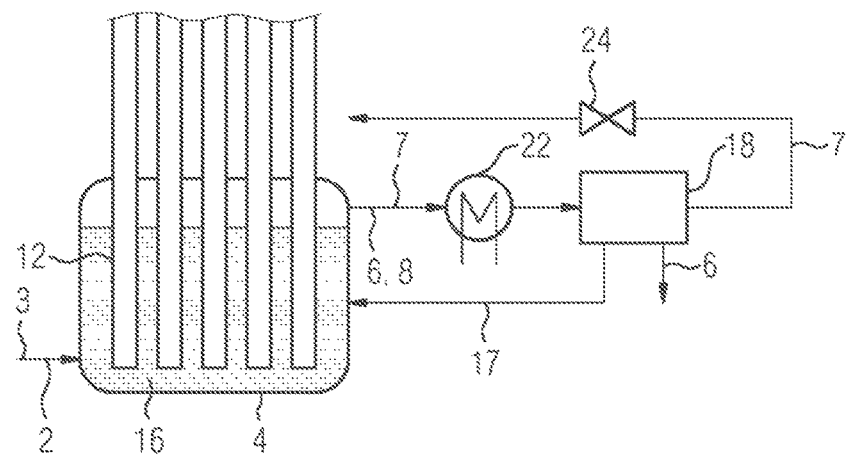
FIG. 2 a section from a reactor from FIG. 1 with a reaction chamber and a more detailed diagram of a product separation apparatus between two reactor chambers.

Heat carrier oils and nonpolar liquids as carrier liquids 16 for the liquid phase reactor, as shown by way of example in FIG. 2 in the reaction chambers 4, 10 in the reactor 20, have a certain vapor pressure at the reaction temperatures. As a result, on removal of the gaseous synthesis products 6, there is a slight discharge from the reaction chamber 4, 10. FIG. 2 is a more detailed diagram of the first reaction stage with the reaction chamber 4 and the corresponding periphery around the inlet 7 and a product separation apparatus 18. To reduce the discharge or loss of carrier liquid 16 and catalyst material, the heat carrier oil here is separated during the removal of the synthesis product 6 and recycled. This is effected in the product separation apparatus 18. This recycling of the carrier liquid 16 is effected via the conduit 17 into the reaction chamber 4. The recycling can be effected by exploitation of gravity effects without the use of a pump.

The synthesis products 6 and unreacted synthesis reactants 8 are removed via an inlet 7. Prior to the removal of the synthesis products, it may be appropriate to lower the temperature. This lowering of the temperature is conducted in the cooling device 22. In the example presented, the temperature is lowered to such an extent that there is condensation of methanol and this can then be removed as synthesis product 6 in the product separation apparatus 18.

FIG. 2 also illustrates that the reaction chamber 4 permeated by heat pipes 12 need not necessarily directly adjoin the next reaction chamber 10. The individual reaction chambers 4 and 10 may also be arranged spaced apart from one another in a sequential manner if this is appropriate on the basis of technical construction.

What is claimed is:

1. A method of conducting a chemical synthesis, the method comprising:
   introducing a fluid synthesis reactant into a carrier liquid present in a reaction chamber with a prevailing chamber pressure p1;
   forming a synthesis product in the reaction chamber consuming at least part of the synthesis reactant;
   drawing the synthesis product and any unreacted synthesis reactant as vapors from the reaction chamber;
   separating the synthesis product from the unreacted synthesis reactant; and
   introducing the unreacted synthesis reactant into a second reaction chamber with a prevailing chamber pressure p2 lower than the pressure p1.

2. The method as claimed in claim 1, wherein the first and second reaction chambers are connected by a heat pipe; and
   a heat of reaction resulting from formation of the synthesis product is exchanged between the reaction chambers.

3. The method as claimed in claim 1, wherein the heat pipe passes out of at least one of the first or second reaction chambers, and heat energy is removed therefrom.

4. The method as claimed in claim 1, wherein the synthesis reactant is converted at least in part to the synthesis product within the carrier liquid.

5. The method as claimed in claim 1, further comprising supplying a particulate catalyst to the carrier liquid.

6. The method as claimed in claim 1, wherein the carrier liquid comprises an oil.

7. The method as claimed in claim 1, wherein the first and second reaction chambers comprise fixed bed reactors with a catalyst; and
   reaction of synthesis reactant to the synthesis product takes place in the gas phase.

8. The method as claimed in claim 1, wherein the first and second reaction chambers comprise fluidized bed reactors with a catalyst;
   a gas stream flowing in from the bottom fluidizes a bed comprising catalyst material; and
   reaction of synthesis reactant to the synthesis product takes place in the gas phase.

* * * * *